H. M. WILCOX.
METHOD OF AND APPARATUS FOR RECOVERING COPPER.
APPLICATION FILED JULY 14, 1917.
1,416,147.
Patented May 16, 1922.
2 SHEETS—SHEET 1.
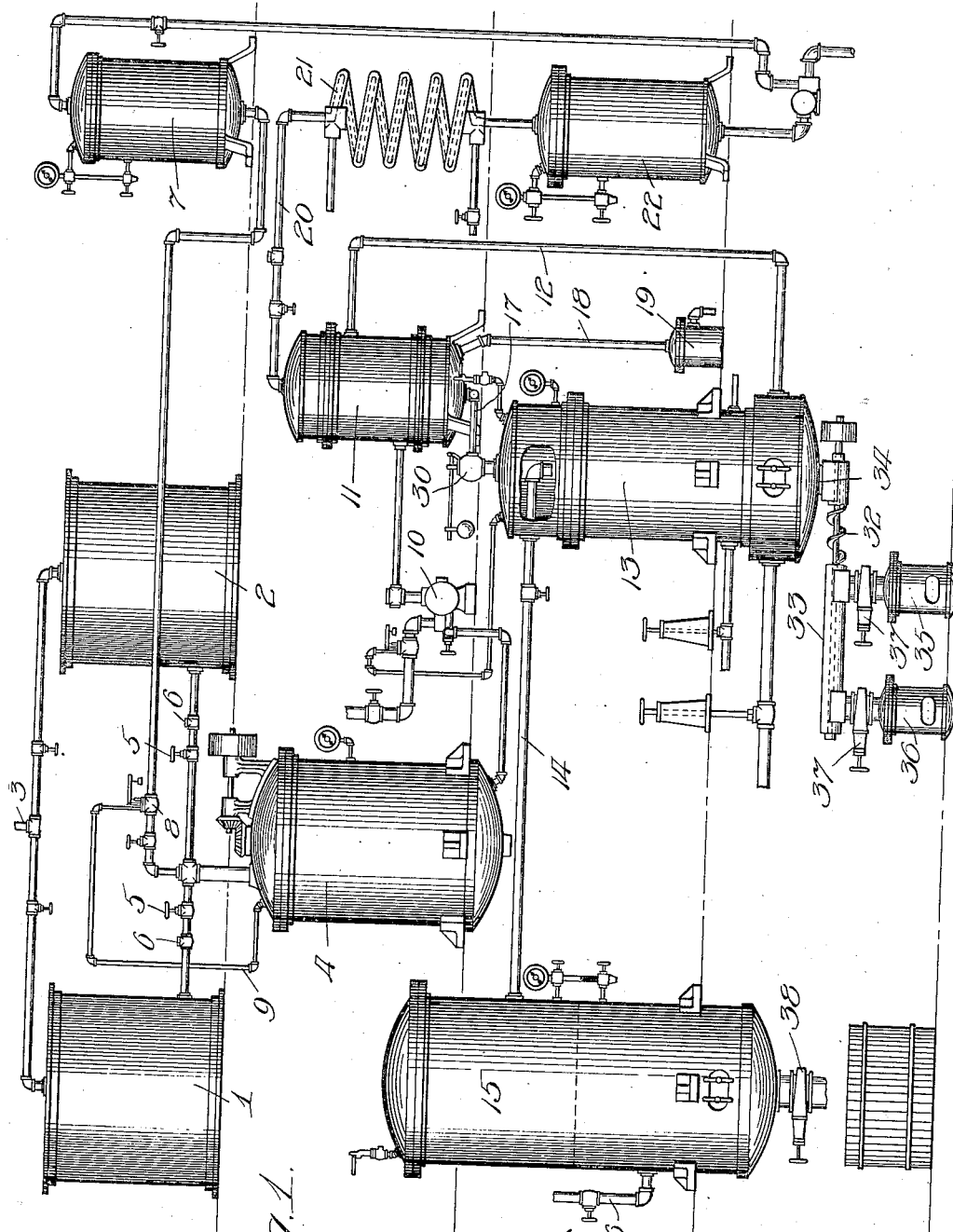

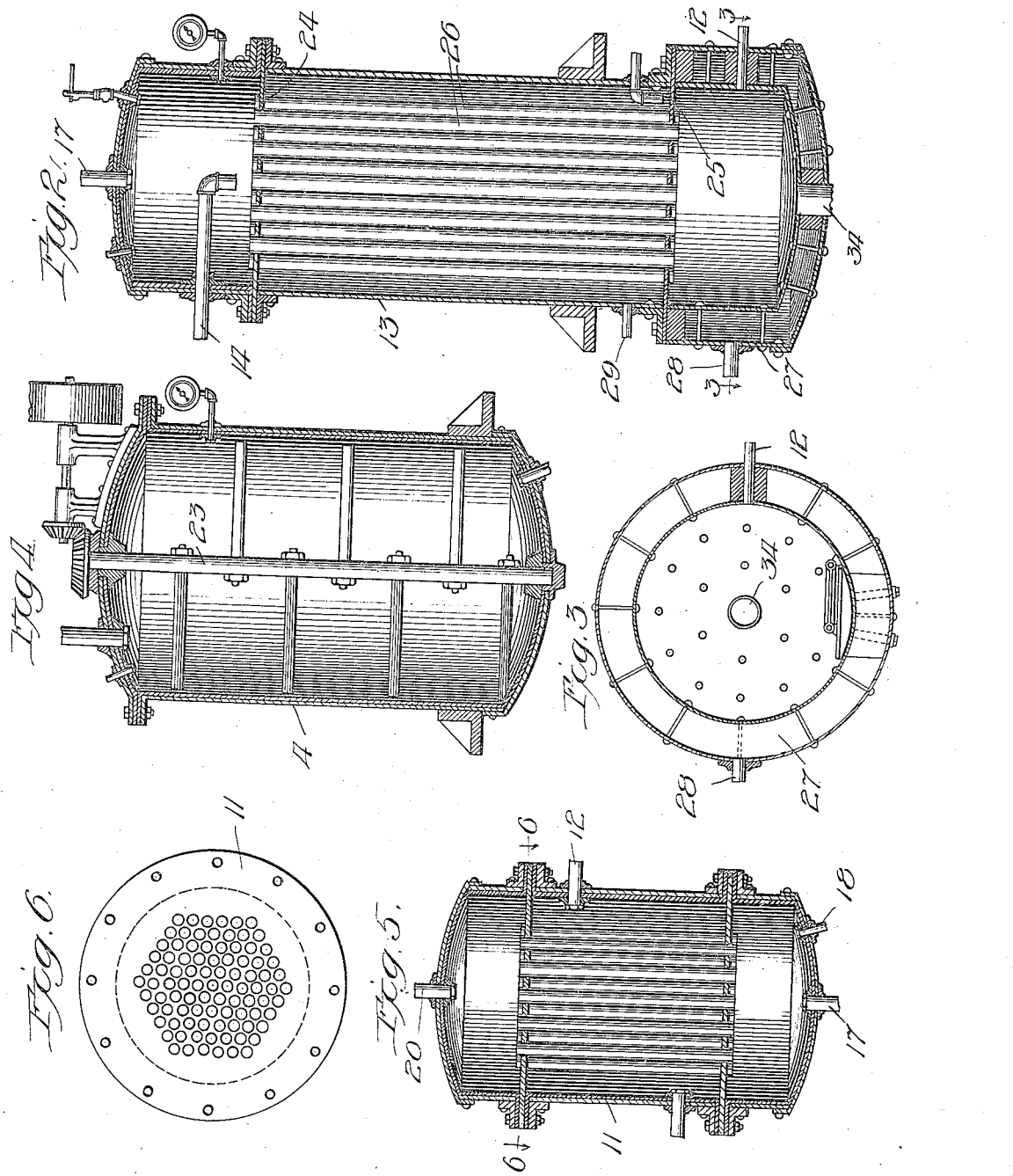

UNITED STATES PATENT OFFICE.

HENRY M. WILCOX, OF CHICAGO, ILLINOIS, ASSIGNOR TO FREDERIC C. L. D'AIX, OF CHICAGO, ILLINOIS.

METHOD OF AND APPARATUS FOR RECOVERING COPPER.

1,416,147.

Specification of Letters Patent. Patented May 16, 1922.

Application filed July 14, 1917. Serial No. 180,509.

*To all whom it may concern:*

Be it known that I, HENRY M. WILCOX, a citizen of the United States, residing at Chicago, county of Cook, State of Illinois, have invented a certain new and useful Improvement in Methods of and Apparatus for Recovering Copper, and declare the following to be a full, clear, and exact description of the same, such as will enable others skilled in the art to which it pertains to make and use the same, reference being had to the accompanying drawings, which form a part of this specification.

In my prior Patent No. 1,066,968 of July 8, 1913, I have disclosed an apparatus for the recovery of copper in a metallic state from a copper sulphate solution. The aforesaid apparatus permits the process to be carried on only intermittently, a definite charge of the solution being treated and the copper and spent liquid being then withdrawn for the purpose of permitting a new charge to be introduced.

The object of the present invention is to produce a novel form of apparatus which will permit the process of recovering the copper to be a continuous one.

A further object of the present invention is to produce an apparatus which will not only permit the process of recovering copper to be carried on continuously but which will simplify and improve the process so as greatly to cheapen it and at the same time make it possible to secure uniform results with the exercise of a minimum amount of care.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 shows in elevation a preferred arrangement of my improved apparatus, the parts being broken away to expose other parts which would otherwise be hidden;

Fig. 2 is a central vertical section on an enlarged scale through the precipitating tank;

Fig. 3 is a section taken approximately on line 3—3 of Fig. 2;

Fig. 4 is a central vertical section through the mixing or absorption tank;

Fig. 5 is a central vertical section through the combined cooler and heater; and Fig. 6 is a section taken approximately on line 6—6 of Fig. 5.

Reference being first had to Fig. 1, 1 and 2 represent tanks, preferably occupying an elevated position, adapted to contain a neutral copper sulphate solution; the purpose of providing two tanks being to permit a standard solution to be withdrawn from one while the other is being filled; and the filling of the tanks being effected through a suitable supply pipe, 3. From the storage tanks 1 and 2 the copper bearing solution flows into an absorption or mixing tank, 4, preferably located below the storage tanks so that the flow can be by gravity. Between the absorption and mixing tank and each of the storage tanks are arranged a suitable shut-off valve, 5, and a check valve, 6, or their equivalents. In the tank 4 the copper sulphate solution is mixed with sulphur dioxide delivered in liquid form from a supply tank, 7. In the pipe leading from the tank 7 to the tank 4 is a regulating valve, 8, controlled by the pressure in the tank 4; a small pipe, 9, leading from the top of the tank 4 to the regulating valve.

The copper sulphate solution saturated with sulphur dioxide is withdrawn from the bottom of the tank 4 by a pump, 10, which pumps it through a heater, 11, from which it passes through a pipe, 12, into the bottom of a boiler or precipitating tank, 13. In the precipitating tank or boiler there occurs a precipitation of metallic copper, the liberation of sulphur dioxide, and the formation of sulphuric acid. The metallic copper is progressively withdrawn from the bottom of the precipitating tank or boiler as will hereinafter be described; the spent liquid combined with the sulphuric acid, is withdrawn from the upper portion of the precipitating tank or boiler through a pipe, 14, and delivered into an expansion tank, 15, from which the liquid is drawn through a pipe, 16, and employed to treat other ores to produce the necessary copper sulphate solution which is then stored up in the storage tanks 1 and 2. The liberated sulphur dioxide escapes from the top of the precipitation tank or boiler through a pipe, 17, which carries it, together with more or less steam, into the heater 11 where it gives up some of its heat units to the incoming fresh solution and, in giving up its heat units, becomes cooled; the water of condensation escaping through a pipe, 18, and steam trap, 19. The partially cooled sulphur dioxide passes from the combined heater and cooler, 11, through a pipe, 20, to a suitable cooler, 21, where liquefaction occurs; the liquid sulphur dioxide flowing down into a receiving tank, 22, from which it is transferred to the supply tank 7.

In the mixing tank, as best shown in Fig. 4, is a stirrer, 23, which rotates while the apparatus is in use, securing effective mingling of the copper sulphate solution and sulphur dioxide.

The heat interchanger, 11, may take any desired form, for example that of a simple feed water heater, properly lined, as shown in Figs. 5 and 6.

The precipitating tank or boiler may conveniently take the form disclosed in my aforesaid patent, comprising a closed cylindrical shell separated into upper, intermediate and lower compartments by means of transverse partitions, 24 and 25; the upper and lower compartments being connected together by tubes, 26, and the lower compartment being surrounded by a jacket, 27. Exhaust steam is supplied to the space between the jacket and the walls of the lower compartment of the boiler through a suitable pipe, 28, while live steam is introduced into the intermediate compartment through a suitable pipe, 29. The pipe 12 enters the lower compartment and the pipe 14 leads from the upper compartment.

It will thus be seen that the liquid which has been heated to some extent in the heat interchanger 11 so as to start the chemical reaction, is heated to a still higher degree as it enters the lower compartment of the precipitating tank or boiler and is then highly heated as it passes up through the tubes 26 into the upper compartment; the final temperature being preferably in the neighborhood of 300 degrees F. which creates a pressure of approximately 110 pounds in the upper compartment of the boiler or precipitating tank. It is not advisable to permit the sulphur dioxide and steam to pass into the heat interchanger 11 at the high pressure that exists in the boiler or precipitating tank and I therefore place a reducing valve, 30, in the pipe 17 for the purpose of preventing a pressure of more than about 50 pounds in the heat interchanger; such a pressure being low enough to prevent the liquefaction of the sulphur dioxide in the heat interchanger.

As the process is continuous there is a continuous precipitation of copper and it is therefore desirable that means be provided for discharging the latter without interrupting the precipitating process. To this end I have placed beneath the precipitating tank or boiler a screw conveyor, 32, arranged in a casing, 33, communicating at one end with the bottom of the precipitating tank and boiler through a conduit or passage, 34. The casing of the conveyor communicates with a pair of receptacles, 35 and 36, spaced apart in the direction of the length of the conveyor and provided with shut-off valves, 37, so that either may be placed in communication with or shut off from the interior of the conveyor casing. With this arrangement, the precipitated copper may be fed by means of the screw to either or both of the receptacles, 35 and 36 and, whenever a sufficient amount of copper has accumulated in one or the other of the receptacles its shut-off valve may be closed so as to permit the removal of the copper without interfering with the discharge of the copper from the precipitating tank or boiler, because the conveyor simply discharges it into the receptacle whose valve remains open.

Since some of the copper may be carried away with the spent solution, the expansion tank, 15, is preferably so constructed that it will also serve as a settling tank to collect the free copper in the spent liquid; the accumulation of copper in this tank being removed through a valve discharge outlet, 38, at the bottom.

It will thus be seen that I have produced a simple process and apparatus for carrying it out, by means of which recovery of copper may be effected continuously without interruption either to supply a new charge of copper bearing solution to be treated or for the purpose of removing the precipitated copper. It will also be seen that I have provided means by which the liberated sulphur dioxide will be recovered and successfully condensed, the lowering of the pressure resulting from the condensation of the gaseous sulphur dioxide allowing the entry of further quantities of sulphur dioxide from the precipitating tank into the heat interchanger. It will also be seen that the passage of the solution to be treated through the heat interchanger conserves some of the heat units that would otherwise be wasted, assists in cooling the discharged sulphur dioxide and sets in motion the chemical reaction which is completed in the boiler or precipitating tank and results in the precipitation of the copper.

While I have illustrated and described my method only as carried out through the use of specific apparatus, I do not desire to be limited to the details of the apparatus illustrated; but intend to cover all forms and arrangements which come within the terms employed in the definitions of my invention constituting the appended claims.

I claim:

1. The continuous method of recovering copper from a copper sulphate solution which consists in continuously withdrawing spent liquid from the top of the precipitating tank or boiler, continuously introducing into the bottom of the tank or boiler quantities of copper sulphate solution in amounts sufficient to compensate for the withdrawal at the top of the tank or boiler, and feeding the precipitated copper out of the bottom of the tank or boiler and removing it without emptying the boiler of the liquid contained therein.

2. In an apparatus for recovering copper from a copper sulphate solution, a reservoir for containing the solution to be treated, a reservoir for containing liquid sulphur dioxide, a mixing tank, means for automatically feeding the liquids from the aforesaid reservoirs to said mixing tank in the proper proportions, a precipitating tank, means for continuously feeding the liquid from the mixing tank to the precipitating tank, and means for continuously withdrawing liquid from the precipitating tank.

3. In an apparatus for recovering copper from a copper sulphate solution, a precipitating tank or boiler having a discharge outlet at the bottom, a plurality of receptacles for receiving recovered copper, a screw conveyor arranged between the outlet in said tank or boiler and said receptacles, and a valve between each of said receptacles and the screw conveyor.

4. In an apparatus of the character described, a reservoir for containing copper sulphate solution, a reservoir for containing liquid sulphur dioxide, a mixing tank, means for continuously supplying the copper sulphate solution and the sulphur dioxide to said mixing tank in proper proportions, a precipitating tank or boiler, an expansion tank, means for continuously feeding liquid from the mixing tank into the precipitating tank or boiler, and means for continuously withdrawing liquid from the precipitating tank or boiler and delivering it into the expansion tank.

5. In an apparatus of the character described, two storage tanks for copper sulphate solution, a tank for containining liquid sulphur dioxide, a mixing tank, and means for automatically feeding liquid from either of said storage tanks and from said sulphur dioxide tank into the mixing tank, precipitating apparatus, and means for producing a continuous flow of liquid from said mixing tank to said precipitating apparatus.

6. In an apparatus for recovering copper from a copper sulphate solution, a reservoir for containing the solution to be treated, a reservoir for containing liquid sulphur dioxide, a mixing tank, means for automatically feeding the liquids from the aforesaid reservoirs to said mixing tank in the proper proportions, a precipitating tank, means for continuously feeding the liquid from the mixing tank to the precipitating tank, and means for continuously withdrawing liquid from the top of the precipitating tank.

In testimony whereof, I sign this specification.

HENRY M. WILCOX.